March 10, 1942.    O. L. CLEVEN    2,275,421
COMBINED PUNCHING AND VERIFYING MACHINE
Filed Sept. 20, 1941    9 Sheets-Sheet 1

INVENTOR
O.L.CLEVEN
ATTORNEY

March 10, 1942.　　　O. L. CLEVEN　　　2,275,421
COMBINED PUNCHING AND VERIFYING MACHINE
Filed Sept. 20, 1941　　　9 Sheets-Sheet 3

INVENTOR
O.L.CLEVEN
By J.T. Moorhead
ATTORNEY

March 10, 1942.  O. L. CLEVEN  2,275,421
COMBINED PUNCHING AND VERIFYING MACHINE
Filed Sept. 20, 1941   9 Sheets-Sheet 4
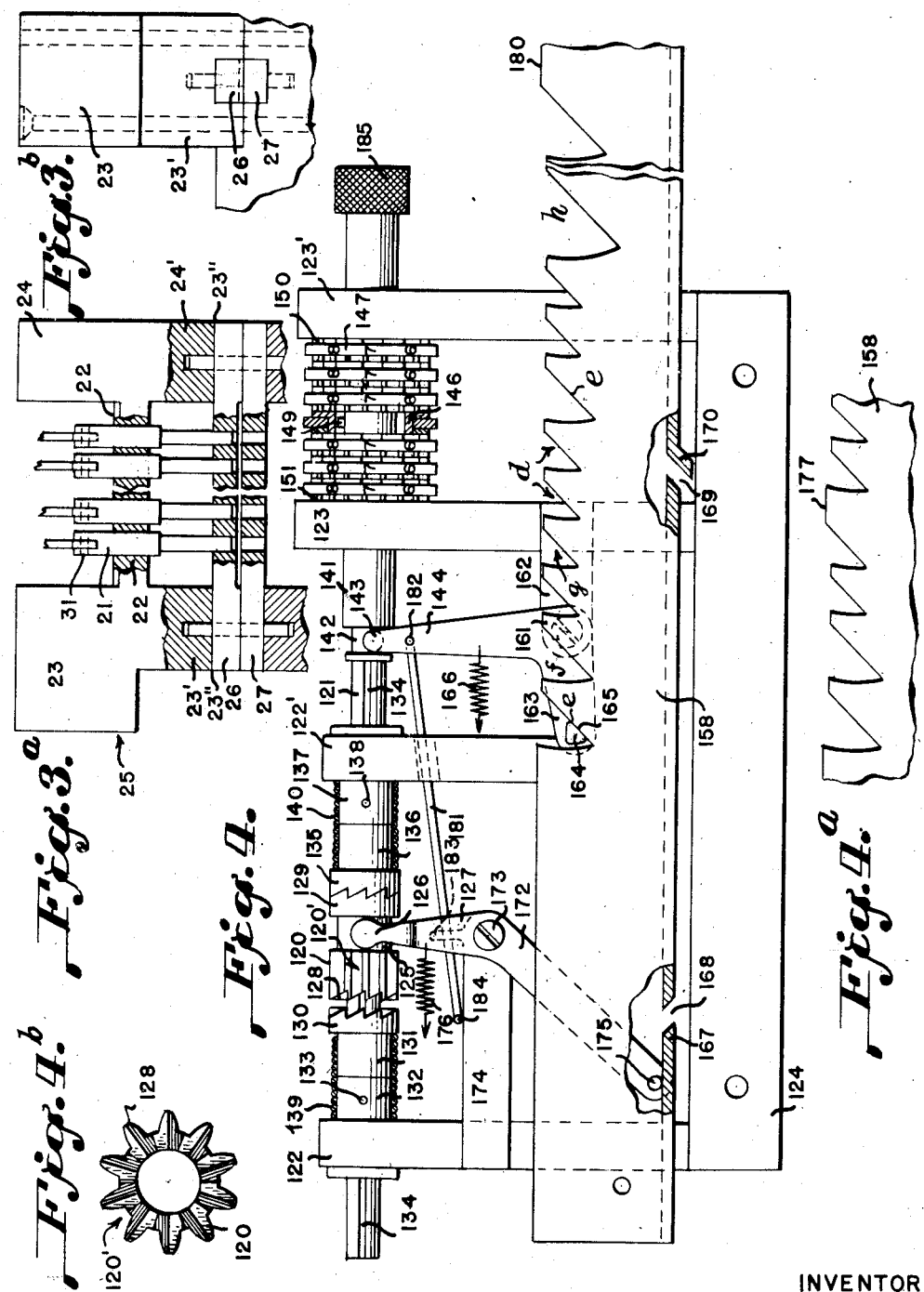
INVENTOR
O.L. CLEVEN
ATTORNEY March 10, 1942.  O. L. CLEVEN  2,275,421
COMBINED PUNCHING AND VERIFYING MACHINE
Filed Sept. 20, 1941  9 Sheets-Sheet 5
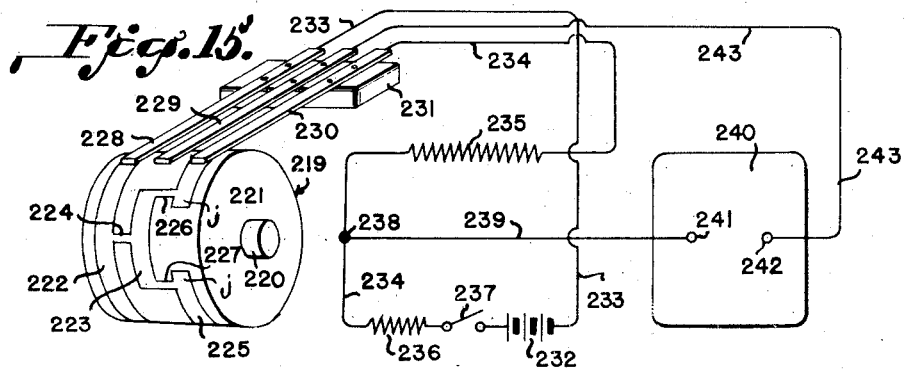
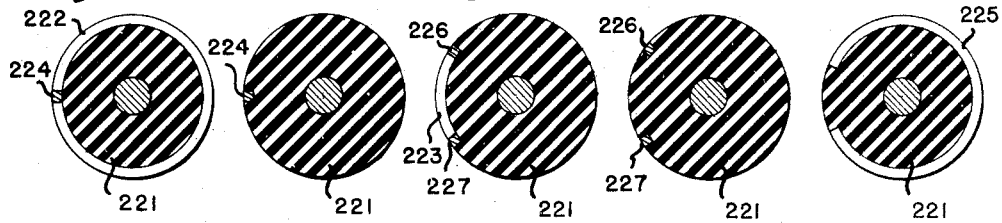
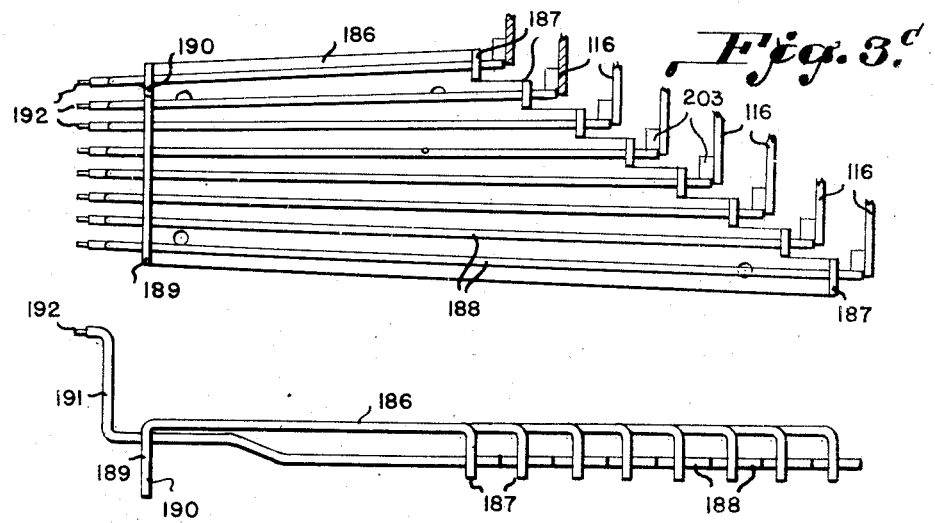
INVENTOR
O. L. CLEVEN
ATTORNEY March 10, 1942.  O. L. CLEVEN  2,275,421
COMBINED PUNCHING AND VERIFYING MACHINE
Filed Sept. 20, 1941   9 Sheets-Sheet 6
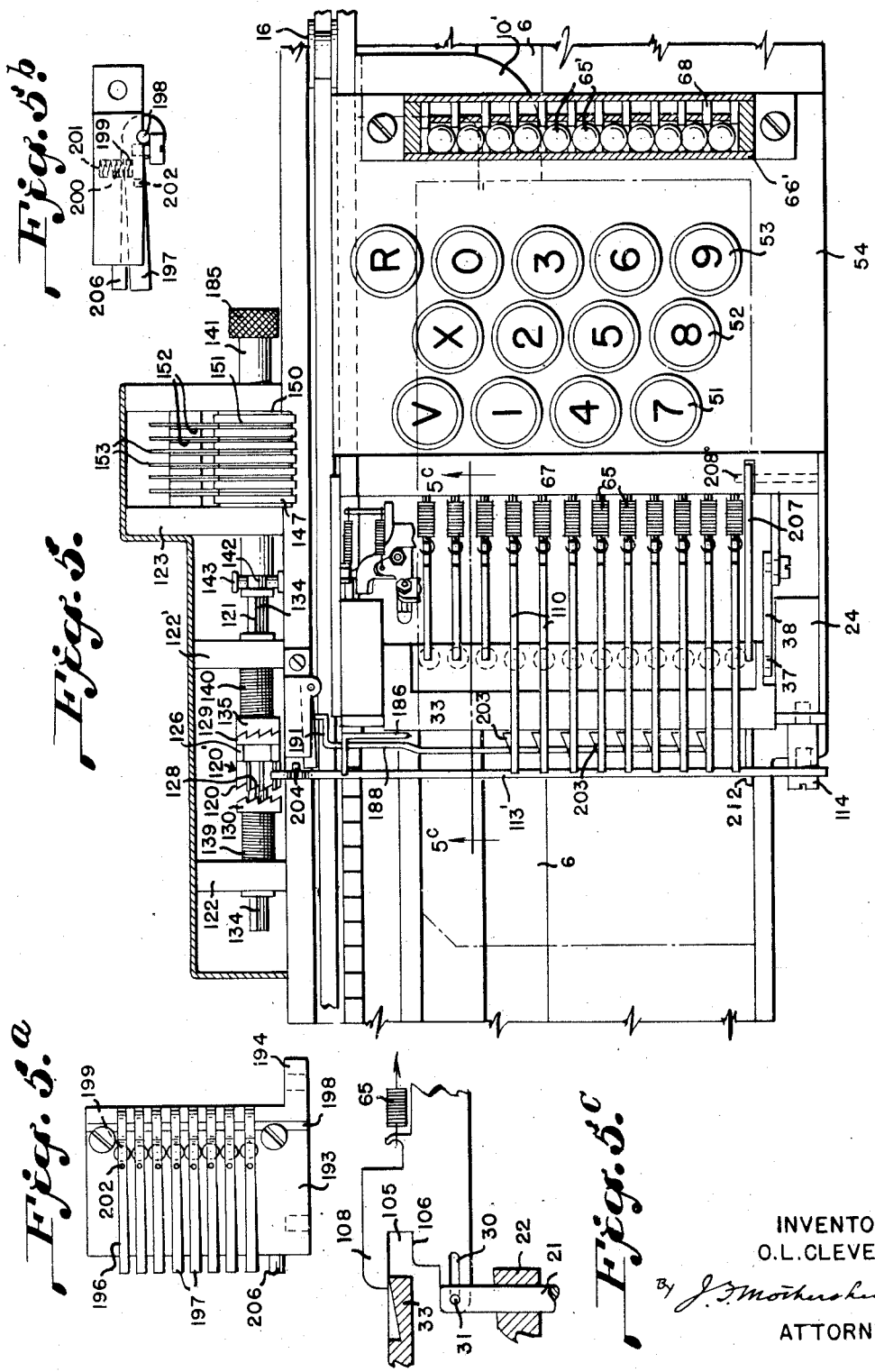
INVENTOR
O. L. CLEVEN
ATTORNEY

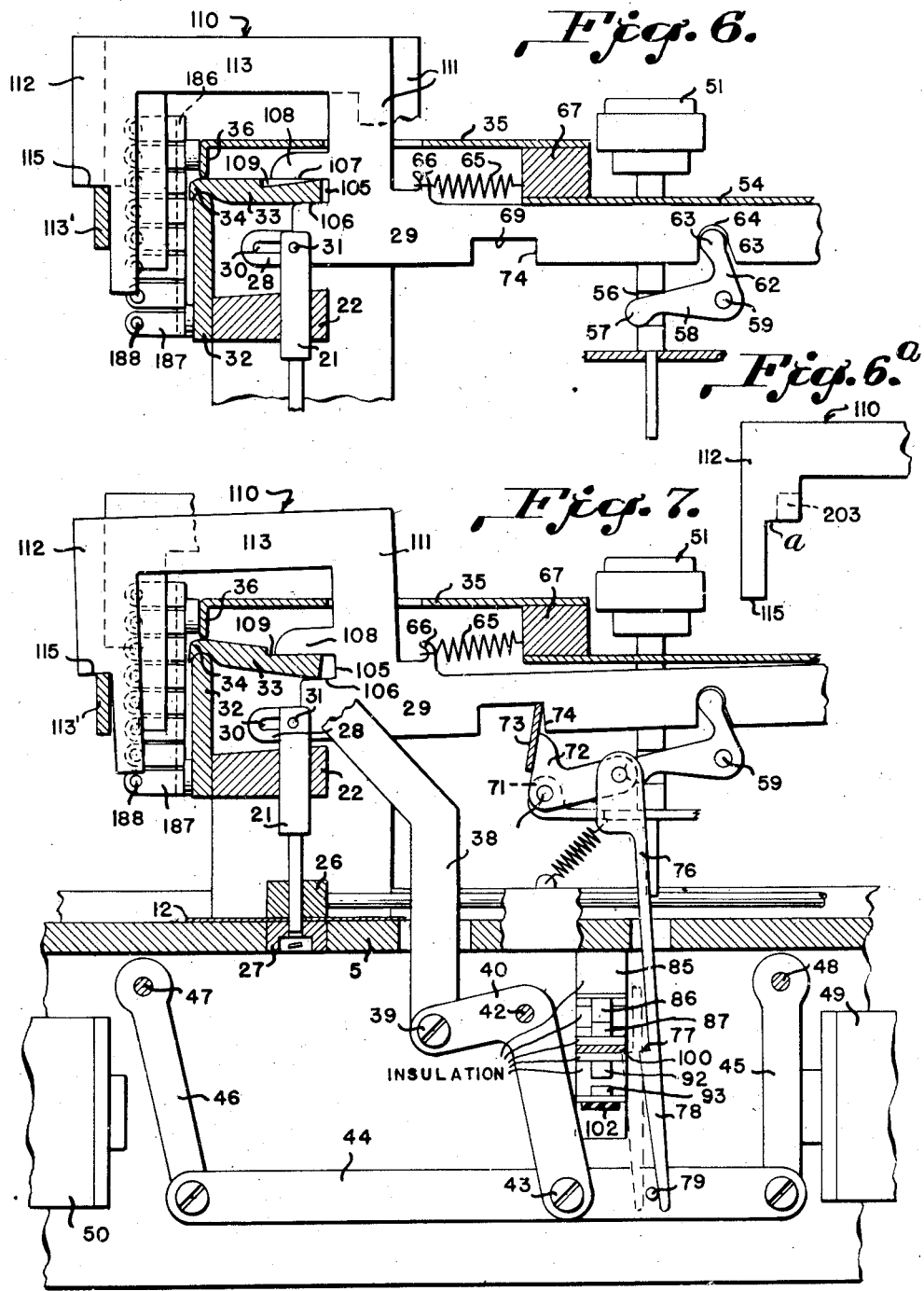

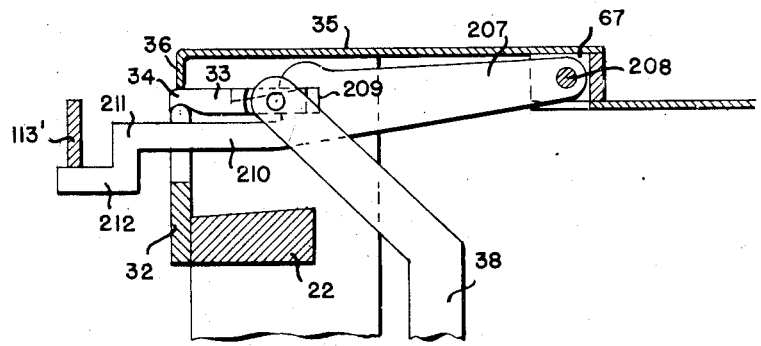
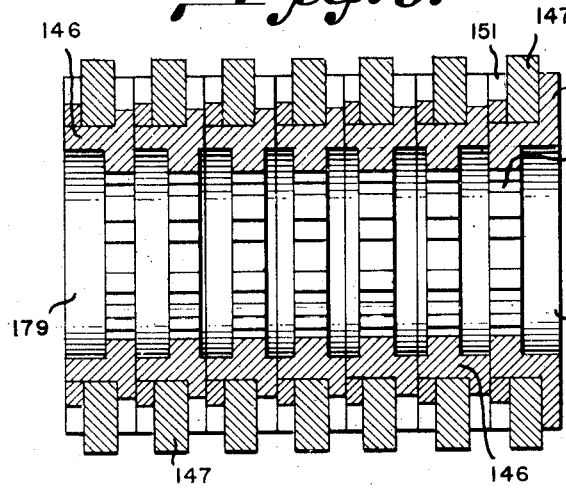
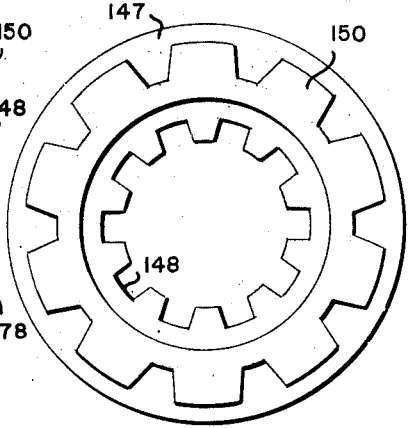
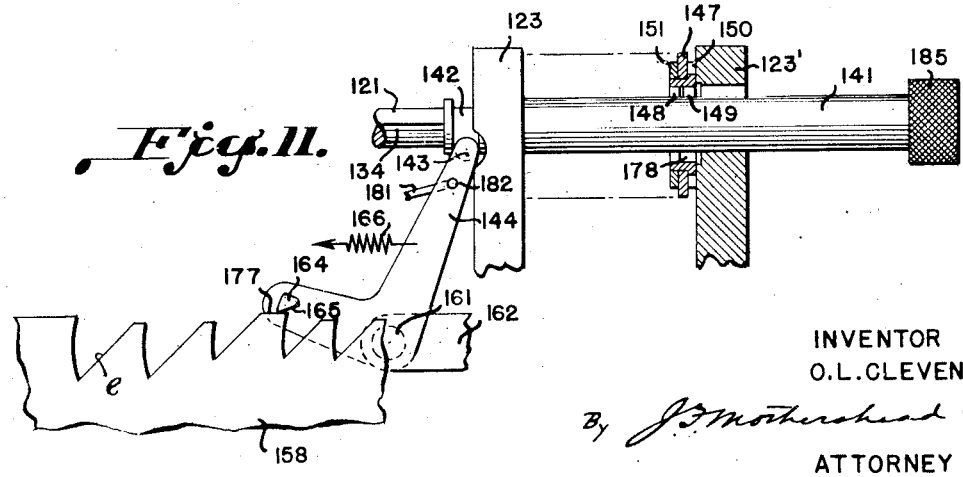

March 10, 1942.　　O. L. CLEVEN　　2,275,421
COMBINED PUNCHING AND VERIFYING MACHINE
Filed Sept. 20, 1941　　9 Sheets-Sheet 9
*Fig. 12.*
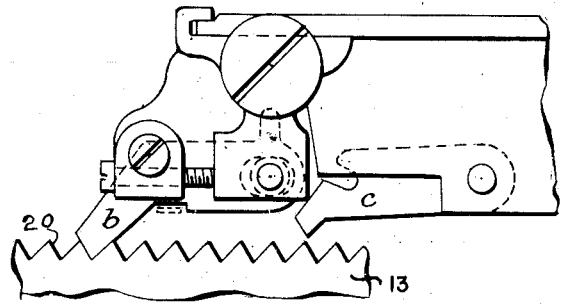
*Fig. 13.*
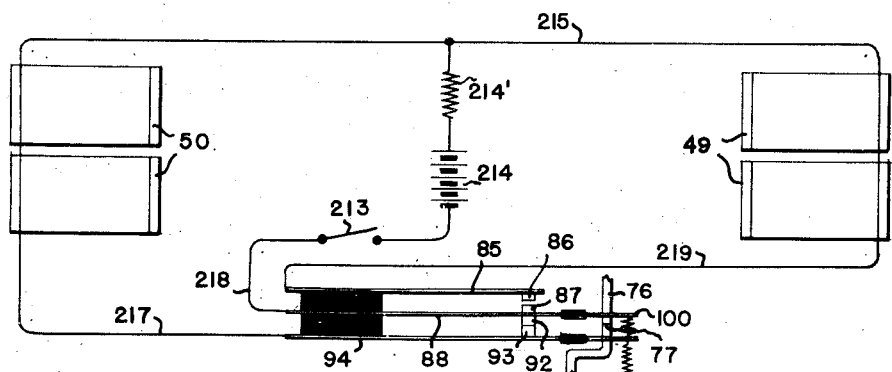
*Fig. 14*
INVENTOR
O. L. CLEVEN
ATTORNEY Patented Mar. 10, 1942

2,275,421

UNITED STATES PATENT OFFICE 2,275,421

COMBINED PUNCHING AND VERIFYING MACHINE

Oluf L. Cleven, Washington, D. C.

Application September 20, 1941, Serial No. 411,768

31 Claims. (Cl. 164—113)

(Granted under the act of March 3, 1883, as amended April 30, 1928; 370 O. G. 757)

This invention relates to a combined punching and verifying machine for use in statistical work in which the data is represented on the record by holes punched therein.

The invention herein described, if patented, may be manufactured by or for the Government and used by the Government for govenmental purposes without payment to me of any royalty thereon.

It is customary to punch the holes in the cards according to information taken from an enumerator "schedule," which is done in a punching operation solely, and thereafter verifying the correctness of the punching by a separate expensive and the time consuming operation. Therefore, one of the primary objects of the invention is to provide a machine with which the punching and verifying is done, or may be done, in a single operation, thereby eliminating the costly operation of separately verifying the record, cards in the present case, especially in connection with agricultural statistical work.

In electrical organizations of machines of the character about to be described, much trouble is caused and much expense is entailed in keeping certain of the electrical contacts from burning out due to sparking or arcing caused by the frequent making and breaking of the circuit.

There are devices for diminishing the destructive effect of arcing wherein the current is called upon to furnish very considerable power, as in the present case where the power for punching the record is electrical instead of manual, such as condensers, etc., but as intimated, these merely reduce the burning of the contacts. Therefore, another object of this invention is to provide an electric circuit involving a main and branch circuits including magnets or motors, or their equivalents, which will furnish the power to punch the record and restore certain of the machine parts to normal position after the perforating operation, and to provide circuit controlling means in which the circuit is never broken, but merely shifted from one branch circuit to another without breaking the main circuit, thereby eliminating all sparking.

I have illustrated a circuit in which two sets of electromagnets are employed with an armature for each set, but it will be understood that any suitable number of magnets may be employed, or magnets, as such, may be dispensed with entirely, and their equivalents used in connection with work other than that about to be described, the main purpose of the arrangement of the circuit and its control being to eliminate all sparking.

I have illustrated as a modification, a circuit in which the magnets, as such, are dispensed with and in which the main circuit is never broken.

If the total of the different items to be punched on the card is known, and said total is punched on the card, then that total becomes the controlling factor in checking or verifying the correctness of the data represented by the holes punched in the card.

Some of the usual census cards have a field headed "total acres," and the following fields will have other headings characterizing the kinds of acres included in the total acres, such for instance as "harvested acres," "pasture acres," "woodland acres," etc., etc.

From the usual farm schedule the operator punches first in the appropriate card field, the total number of acres of all kinds, and thereafter in appropriate fields, the number of particular kinds of acres, and if the number of the particular kinds of acres is correctly punched, the sum of the kinds of acres will agree with the total acres first punched, which was at the beginning of the operation, set up in the counting device of the register forming a part of the machine. Consequently, if the different kinds of acres are, as they are successively punched, successively subtracted from a total number of acres punched at the beginning of the operation, and if the punching has been correctly done, the register will visably register zero. On the other hand, should the register show a difference between the sum of the kinds of acres and the total acres first punched, the difference will be shown on the register and indicate that an error has been made in the punching, and a new card must be made. This is the verification feature of the machine.

The machine is also adapted to be used as an adding machine which adds across the card instead of in the usual vertical direction, and its use as an adding machine is advantageous when the totals of the several items do not appear upon the schedules, as in cases where, for instance, the total number of acres is not known or when the different numbers of acres or items are punched in their appropriate fields on the card, and it is desired to obtain a total of the various items. Under these conditions the operator will punch the number of the different items which will be added on the counters of the register which finally will show the total of all of the items. The operator being enabled to see the counter or counters will now punch the total at the appropriate point on the card.

Upon the punching of the above total in the appropriate field of the card, the arrangement is such that the register or counters will be cleared to zero automatically if the last total was subtracted, and the machine is now conditioned for further operations on the same card as the exigencies of the case may require.

While I have given an instance where the total of all of the items is punched in the final field of the card, it will appear from the following description of the construction and operation of the machine that during the movement of the card carriage and card, the machine may be, at will, made to either add or subtract as the exigencies of the operation may require. In other words, it may be expedient where a total of a number of fields of a card is known, to verify such totals by subtracting to zero on the counters, before proceeding to the remaining fields on the card and thereafter in the fields where the totals of items are not known, the machine will be turned into an adding machine for the remaining portion of the card and the total of the last items will appear upon the register.

As stated, the machine may be operated to either subtract or add, and these functions may be accomplished with equal facility. In the present embodiment of the invention these functions are controlled by a simple bar somewhat like the "skip" bar used on the usual punching machine to make the card carriage skip certain fields on the card where no punching is desired. However, the bar I employ has a very different purpose from the skip bar referred to in that the bar in the present instance controls the actuation of the machine in such manner that if a number, say, for instance, "234" is punched in a field, the "2" will be counted on the "hundreds" wheel of the register, the "3" in the "tens" wheel, and "4" in the unit wheel, as it should be. The same bar also controls the movement of the parts to determine whether the item is to be added or subtracted.

For the most part all of the figures of the drawings are on a greatly enlarged scale.

In the drawings illustrating the invention:

Figure 3a is a detail fragmentary view of the housing for the punches and closely associated mechanism including some of the punches.

Figure 3b is an end view of Figure 3a.

Figure 3c is a side elevation of the plate in which the pins which form a part of the mechanism for preventing overthrow of the register wheels are mounted, and fragments of the punch actuator bars and wedges thereon for camming the pins into operative position.

Figure 3d is a top edge view of the same, omitting the punch actuator bars.

Figure 4 is a side elevation of the register and register control mechanism removed from the punching machine and showing the control bar and parts actuated thereby for controlling the order of the amounts stored in the register, and for determining whether the amount is to be added or subtracted.

Figure 4a is a detail fragmentary view of a control bar showing an extended cam surface to render the register inoperative at certain points during the advancement of said bar.

Figure 4b is a face view of the gear portion of one of the clutch elements carried by the register operating spindle.

Figure 5 is a plan view of a portion of the machine, somewhat enlarged over Figure 1, with certain of the parts broken away and others omitted, showing the relation of the keyboard to the punch actuator bars and register.

Figure 5a is a detail view of the block in which the stop levers for preventing overthrow of the register actuating parts, are mounted.

Figure 5b is a top plan view of the block.

Figure 5c is a fragmentary detail view of the punch actuator bars which do not actuate the register, or the bars appropriate to the keys "V", "X" and "O".

Figure 6 is a detail sectional view similar to Figure 2, showing the "7" key depressed with the parts in the position they occupy just before a machine operation takes place.

Figure 6a is a fragmentary view of one of the recessed punch actuator bars.

Figure 7 is a view similar to Figure 6, the parts being in operated position.

Figure 8 is a detail sectional view taken about on the line 8—8 of Figure 1, showing the devices for restoring the actuator arm to normal position.

Figure 9 is a greatly enlarged longitudinal section of the register assembly.

Figure 10 is an end view of the register viewed from the end which carries the tens-carry wheel, the numeral wheel, and the recess in the hub for the passage of the key for rotating the register wheels.

Figure 11 is a fragmentary view, showing the register spindle shifted by the control bar to a position in which the rotation of the spindle will not operate any of the numeral wheels of the register.

Figure 12 is a fragmentary view of parts of a conventional escapement mechanism for controlling the advancement of the card carriage and control bar.

Figure 13 is a face view of the upper part of a card of the kind the machine, in the present embodiment of the invention, is, as indicated in the preamble, adapted to operate upon, the card in this instance bearing indicia appropriate to agricultural statistics and indicating the number of columns in each field.

Figure 14 is a view of a wiring diagram, showing the arrangement of the magnets and contacts.

Figure 15 is another wiring diagram for shifting the current from one circuit to another without breaking the main circuit; and Figures 16, 17, 18, 19 and 20 are sectional views of the commutator shown in Figure 15.

Figure 1:
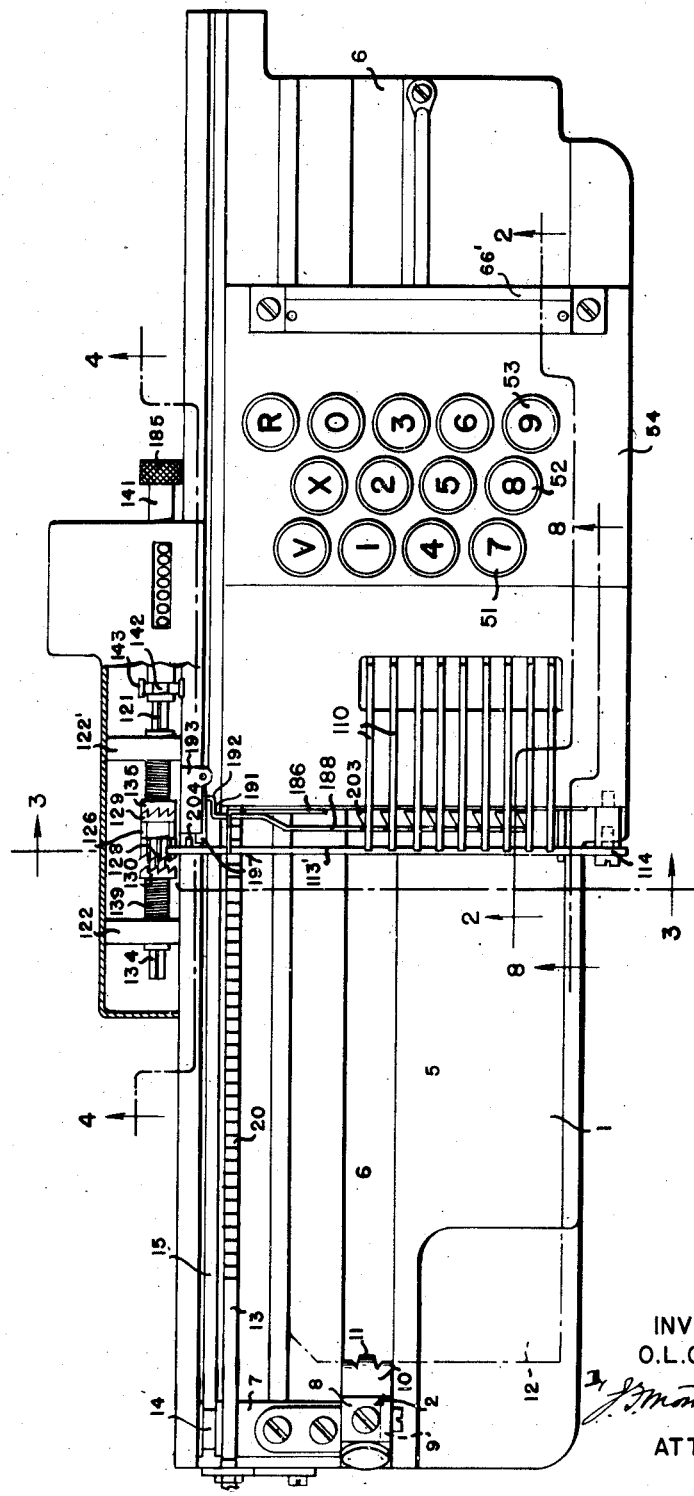
Figure 1 is a plan view of the machine.

Referring to the drawings the numeral I designates the base of the machine upon which the card carriage 2 is mounted. This base is formed with side pieces 3 and 4 (Fig. 3), spanned near their upper ends by a table 5 provided with the usual longitudinal groove 6 extending the entire length of the table.

There is the usual card carriage for advancing the card, comprising in the main a laterally extending end piece 7, which includes an upwardly extending end member 8 which carries a roller 9, extending into the groove 6, there being integral with said member a downwardly extending arm 10 (Fig. 1) from which is struck a lip 11 which overlies the card 12, when a card is in position in the carriage. The opposite end of the end piece 7 is attached to the rack 13 which rack carries a roller 14 that runs on track 15, extending for the whole length of the machine, the rack being sufficiently long to support, in proper position, a piece 10' (Fig. 5) similar to the end piece 7 serving as a stop to properly locate the card in the machine and properly position it for punching. The rack 13 carries at its opposite end a roller 16 (Figs. 3 and 5), similar to the roller 14, which rides on the track 15.

The underside of the rack is provided with gear teeth 17 (Fig. 3), which mesh with gear 18, driven by a spring contained in a drum 19. The spring is put under tension when the carriage is manually moved toward the keyboard to condition it to move the carriage in the opposite direction as the machine is operated, as usual.

The upper edge of the rack 13 is provided with the usual ratchet teeth 20 which cooperate with suitable escapement pawls b and c (Fig. 12), to control the step-by-step movement of the carriage, all of which is old and well known in the art, as exemplified by the patent to Schaaff, No. 1,426,223, and other patents prior thereto.

Figure 2:
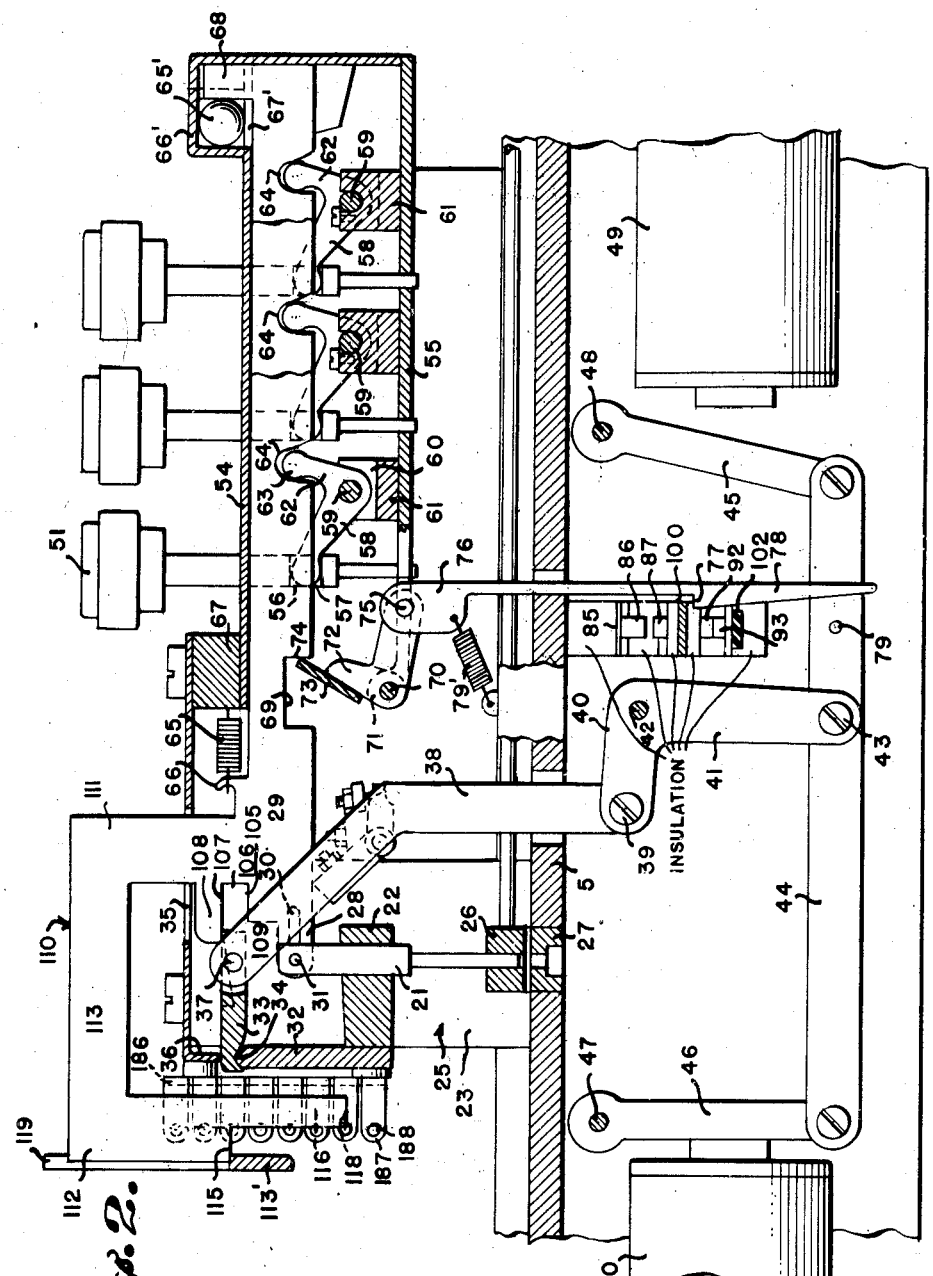
Figure 2 is a longitudinal sectional view taken about on line 2—2 of Figure 1 looking in the direction of the arrow, showing in elevation some of the punch actuators and associated parts including the magnets that, when energized, furnish the power to depress and retract the punch and restore certain of the machine parts to normal position, and also to actuate the register.
Figure 3:
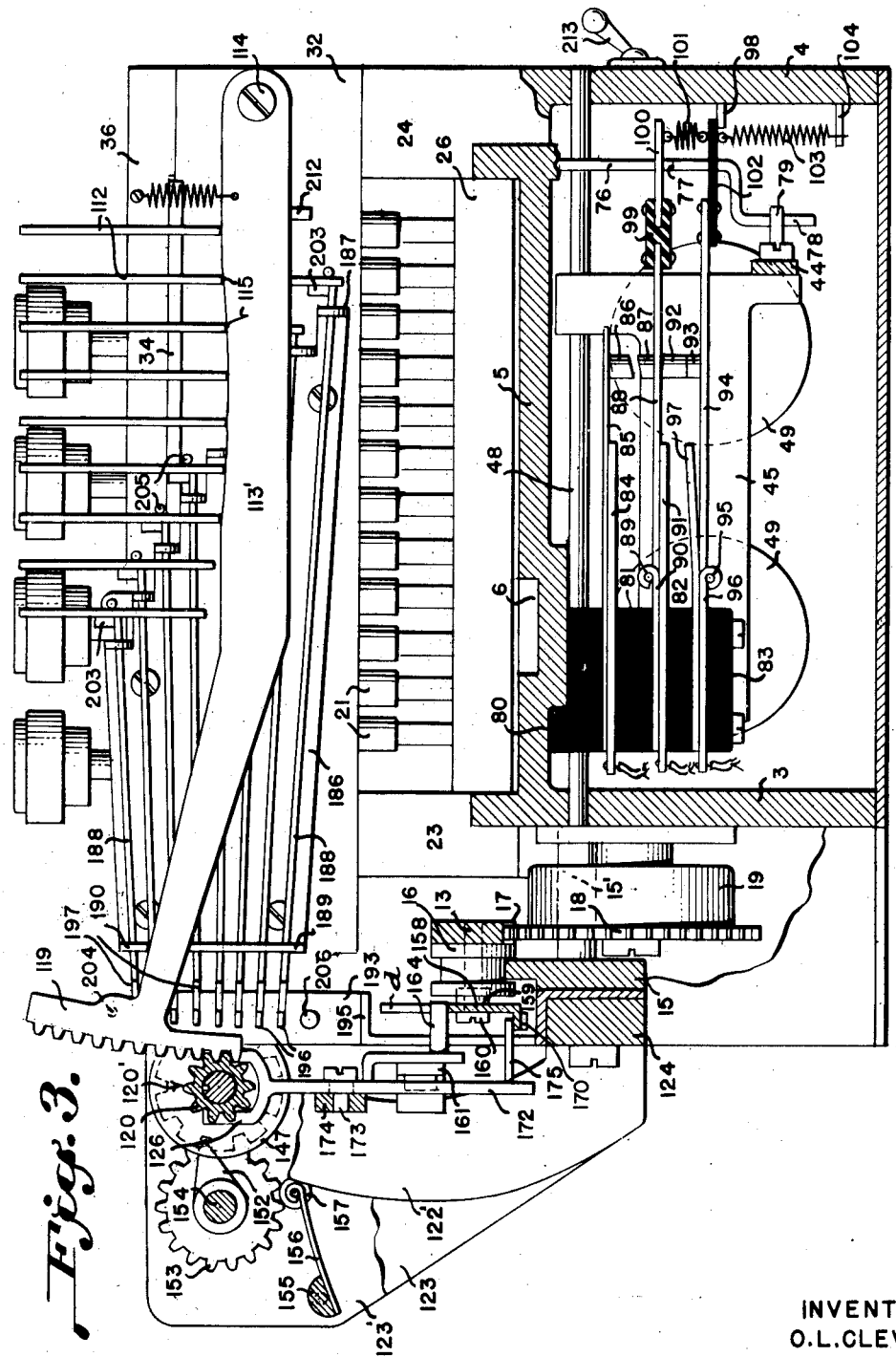
Figure 3 is a sectional view taken about on line 3—3 of Figure 1 and showing the forward edges of the punch actuator bars and register operating arm and its relationship to the register, and also means for alternately shifting the current from one set of magnets to the other, to first punch the record and thereafter restore the machine parts to normal position.

The punches for perforating the cards are twelve in number and their construction and arrangement are best shown in Figs. 2 and 3. Referring particularly to Fig. 2, the numeral 21 designates the punch which is of two diameters, the larger or upper part being guided in a crossbar 22 integral with the side pieces 23 and 24 of a housing 25, the general shape of which, looking toward the left end of the machine, is shown in Fig. 3a. The piece 23 is extended below the crossbar 22 as indicated by the numeral 23' in the lower end of which is a recess 23", there being a similar recess in the downward extension 24' of the side piece 24, both for the reception of a bar 26 that receives and guides the lower ends of the punches. Directly beneath the punch guides is a transverse recess in the table 5 in which there is a die 27 which cooperates with the punch in the usual way. The upper enlarged end of the punch is bifurcated and embraces an extension 28 (Fig. 2) of the punch actuator bar 29. There is an elongated slot 30 for the passage of pin 31 passing through the bifurcated end of the punch and through the slot, thus providing for the necessary sliding movement of the actuator bar in the operation of the machine.

The numeral 32 designates a vertical plate secured to the front of the housing 25, which plate extends entirely across the machine. Its upper edge is preferably rounded as shown and forms a fulcrum for the transverse plate 33 whose lefthand end is provided with a shallow hook 34 to rest upon and effectively rock on said plate. On the under side of the top plate 35 of the housing is a transverse rib 36 which rests lightly on the plate 33, both the plate and rib extending a sufficient distance through the width of the machine to encompass all of the punches and actuator mechanism.

Pivoted to one end of the plate 33, as indicated at 37, is the upper end of the bent link 38 whose lower end is pivoted at 39 to the arm 40 of a bell-crank 41 pivoted at 42 to the side of the base of the machine. The lower end of the bell-crank is in turn pivoted at 43 to link 44 to whose ends are pivoted the armatures 45 and 46, which in turn are pivoted at 47 and 48 to the side of the machine. The armatures cooperate, in the operation of the machine, with magnets 49 and 50, the magnets 49 operating to actuate the punches and perforate the card, and the magnets 50 serving to retract the punches and restore the actuating mechanism except when the punch actuator bars 29 and the key parts to normal, as will more clearly appear in the description of the operation of the machine.

Continuing to refer to Fig. 2, the numerals 51, 52 and 53 designate the keys which are of usual construction and extend through the upper and lower plates 54 and 55, in which they are guided. As illustrated, these three keys represent the keys "7," "8" and "9" in Fig. 1. Each key is provided with a recess 56 for the reception of the rounded ends 57 of bell-cranks 58 rockably mounted upon similar rods 59 in the recesses or kerfs 60 in bars 61 firmly secured to the plate 55. The other arm 62 of the bell-crank 55 is provided with rounded end 63 received in a recess 64 in the punch actuator bar 29 so that when, through the instrumentality of the bell-crank, any key, except the release key R is depressed, the bar 29 will be moved in to position to actuate the punch. There is a spring 65 secured to each punch actuating bar at 66 and a crossbar 67 secured to the top plate 54, which springs serve to return the actuating bars and keys to normal position upon the operation of any key except the release key.

The means for preventing two keys from being depressed at the same time, or before the first key is completely restored, comprises a number of balls 65' (Figs. 2 and 5) confined within a transversely arranged housing 66' appropriately placed upon and attached to plate 54, which plate within the housing is provided with a number of recesses or slots 67', one for each punch actuating bar, each of which is provided with an upward extension 68 adapted to work in said slots. The length of the housing is such as to accommodate all of the balls and confine them laterally, with but little space between them, the balls being of such diameter as to fill the housing with the exception of a potential space between any two of them substantially equal to the thickness of the extension 68, so that when an actuator bar is moved forward by the depression of a key, an extension 68 will occupy all the available space between the balls and therefore prevent the extension of any other bar from moving in between the balls, thus preventing the operation of any actuating bar except the one advanced by the first key.

*Motor controlling means*

About centrally on the underside of the actuating bar 29 is a recess 69, one of which, it will be understood, is in each of the twelve bars. Pivoted on rod 70 having a bearing in oppositely disposed ears 71 is a bell-crank 72. Opposite the upwardly extending arm of the bell-crank and pivoted on the rod 70 is an arm similar to said bell-crank arm, and attached to these two arms is a bail 73 whose upper end extends into recesses 69 in the actuating bars, and consequently in position to be engaged by the shoulders 74 of the recesses upon the movement of the actuator bar toward the left or operated position.

The lower arm of the bell-crank 72 is pivoted at 75, to rod 76 extending downwardly and having formed thereon, near its lower end, a shoulder 77 for controlling the contacts that control the circuit to the motors or magnets 49 and 50. The rod 76 has an extension 78 adapted to be engaged by stud 79 on the link 44 to aid in the control of the magnets. A spring 79' attached to the head of rod 76 and to an ear on the base, tends to hold the rod in position to engage the contact strips to be presently described. Referring to Fig. 3, the numerals 80, 81, 82 and 83 designate four blocks of insulating material. Between the blocks 80 and 81 is secured a metallic strip 84 which serves to limit the downward movement of the resilient contact strip 85 provided at its outer end with a contact point 86 which is arranged to make contact with a similar contact point 87 carried by contact strip 88, hinged at 89 to an extension 90 resting upon a limiting piece 91, the contact strip and the limiting piece being supported between the blocks 81 and 82. The contact strip 88 carries on its underside a contact point 92 shown in contact with contact point 93 carried by the lowermost contact strip 94, which is hinged at 95 to a continuation 96 of said strip. This continuation 96 is supported, together with a limiting piece 97, between the insulating blocks 82 and 83. The limiting pieces are so arranged, as shown, that they limit the downward movement of the upper two contact strips, whereas, the lower strip is limited in its upward movement by piece 97 and in its downward movement by stud 98 on the inner side of the base. The outer end of the strip 88 is let into a block 99 of insulating material and firmly held therein. Also let into the block is a metallic piece 100 positioned to be engaged by shoulder 77 on the rod 76 to make contact between the contact points 86 and 87. To the underside of the piece 100 is attached a spring 101 whose outer end is attached to a piece 102 of insulating material securely fastened to the lowermost contact strip 94. To the underside of the piece 102 is attached a spring 103, weaker than spring 101, whose lower end is attached to a pin 104 in the side of the base.

When any key is depressed, the actuator bar 29, (Fig. 2) through the instrumentality of the bell-crank 58, is brought toward the left causing the bail 73 to rock bell-crank 72 and consequently lift the rod 76 causing the shoulder 77 to engage and lift the contact strip 88, and the spring 101 being stronger than the spring 103 causes both the lower contact strips to move upward together until the strip 94 is arrested by the limiting piece 97 (Fig. 3). In this upward movement of the strips the contact point 87 makes contact with the contact 86 before the contacts 92 and 93 are broken. On the further upward movement of the shoulder 77, the lower contacts 92 and 93 are broken, thus momentarily both contacts are made, the contacts 92 and 93 controlling the magnet 50 and the contacts 86 and 87 controlling the magnets 49, thus for a moment both sets of magnets are energized; but upon the further upward movement of the shoulder 77 the lower contacts are broken, shifting the current solely to magnets 49 which furnish the power to do the punching. When the armature 45 reaches the magnets 49, the stud 79 on link 44 will have engaged the rod 78, and rocked the shoulder 77 out of engagement with the piece 100, thereby releasing the contact strip 88 and again causing both sets of magnets to be momentarily energized, but upon a still further downward movement of the lower contact strips under the influence of springs 101 and 103, the contacts 92 and 93 are again closed and contacts 86 and 87 are broken, thus shifting the current into the magnets 50 until another key is depressed. The shoulder 77 remains above the metallic piece 100 until the key that was depressed is released and the actuator bar returns to its normal position. Meanwhile, due to the influence of the spring 79', the rod 76 is moved downward and the shoulder 77 is again brought beneath the metallic piece 100, when the machine is in readiness to have another key depressed.

Above the slotted extension 28 each actuator bar is recessed as indicated at 105, forming two shoulders, a lower shoulder 106 and an upper shoulder 107, the upper shoulder being the underside of a tongue 108 integral with the actuator bar. The end of the plate 33 always extends to a certain extent into the recess 105 (Fig. 2), and when a key is depressed moving the actuator bar to the left, the plate extends further into the recess 105 (Figs. 6 and 7) and is brought into position to engage the shoulder 106. When the parts are in the position described, the actuating bar will have moved sufficiently forward to move the bail 73 and through the instrumentalities of the element 72 and rod 76 will close contacts 86 and 87 and energize magnets 49, which will, through the linkage 38 and 41 pull down the plate 33 which is now in engagement with shoulder 106, and operate the punch to perforate the card (Fig. 7). In order to prevent binding between the tongue 108 and the top of the plate 33 during the downward movement of the actuating bar, I provide an angular longitudinal recess 109 in the plate 33 into which the tongue 108 slightly rocks upon the downward movement of the bar and plate.

When, as explained, the circuit is made through the magnets 49 to operate the punch, the circuit is immediately shifted to magnets 50, which will operate the linkage 38 and 41 in the opposite direction to restore the plate 33 and bar 29 to normal position and retract the punch, whereafter, the card carriage will be stepped up by the usual escapement mechanism a distance of a column as usual—which may be effected by a mechanism substantially as that illustrated in the patent to Schaaff hereinbefore mentioned.

*Register operating mechanism*

A numeral 29 indicates the punch actuator bars for the keys from 1 to 9. Each arm is formed with a rectangular integral extension 110 made up of vertical arms 111 and 112, and a connection arm 113, the arm 111 extending through an opening in the top plate 35.

Each of the arms 112 has a shoulder 115, for engagement with the upper edge of the operating arm 113' pivoted at 114 to the front of the machine, and some of the arms 112 have tails or extensions 116 which vary in length and carry means cooperating with the mechanism for preventing overthrow of the register operating arm 113', and others of the arms 112 are recessed as at a. These recessed arms also carry means cooperating with the overthrow preventing mechanism, as will presently be more fully described.

The first actuator bar 29, of which the vertical arm 112 is a part, is appropriate to the "9" key, and is the one that appears in Fig. 3 nearest to the pivot 114 of the register operating arm 113'. This bar has shoulders 115, but has no means attached for cooperating with the overthrow preventing mechanism, such means being provided elsewhere, as will appear.

The arm 113 (Fig. 3) extends across the machine and has integral therewith a segment 119 having an appropriate number of teeth in mesh with the teeth of an elongated gear 120 formed on a sleeve 120' loosely and slidably mounted on a spindle 121 having bearings in standards 122, 122', 123 and 123' (Fig. 4), integral with a bar 124 which is secured to the bar 15, which is provided at appropriate intervals with laterally extending pieces 15' (Fig. 3) by which it is firmly secured to the side 3 of the machine.

The sleeve 120' is formed with an annular groove 125 for the reception of the yoke 126 of a clutch operating lever 127, which will presently be more fully described. The opposite ends of the sleeve constitute toothed clutch members 128 and 129, the member 128 being arranged to cooperate with a similar clutch member 130 on a short sleeve 131 loosely mounted on the spindle 121 and abutting against a similar sleeve 132 keyed on the spindle, there being a key 133 on the sleeve and slidable in the keyway 134. The clutch member 129 cooperates with a similar clutch member 135, like the clutch member 130, loosely mounted on the spindle and provided with a short sleeve 136 loosely mounted on the spindle and abutting against the sleeve 137 similar to sleeve 132. The sleeve 137, like sleeve 132, is provided with a key 138 which slides in the keyway of the spindle. Surrounding these sleeves 131 and 132 and 136 and 137 are spiral springs 139 and 140, the tortional action of which is utilized for the purpose of revolving the spindle in one direction or the other as the exigencies of the operation may require. As shown in Fig. 4, the clutch members being interlocked, the spindle will be rotated in clockwise direction, and when the sleeve 120' is shifted to the left by the lever 127, it will disengage said sleeve from the clutch member 135 and cause the clutch member 128 of sleeve 120' to engage the member 130, and thus, cause the spindle to revolve in counter-clockwise direction. Referring again to Fig. 4, the part 141 of the spindle, as stated, is mounted in standards 123 and 123' and is provided with an annular groove 142 for the reception of a yoke 143 of a bell-crank 144 for shifting the spindle.

Upon the part 141 of the spindle are rotatably mounted hubs 146 upon which are fixedly mounted the numeral wheels 147 of the register. The inner periphery of the hubs, as best shown in Figs. 9 and 10, has ten notches or recesses 148, in one or another of which the key 149 (Figs. 4 and 11) on the spindle is adapted to enter and rotate the wheel according to the extent to which the wheel is actuated by the movement of the actuator segment 119. Forming a part of each hub is a tooth wheel 150, and on the other side of the numeral wheel is gear wheel 151, the three parts, the numeral wheel, toothed wheel, and the gear wheel being assembled for placement on the spindle as a unit. The tooth wheel 150 cooperates with the tens-carry element 152 (Fig. 3) of which there is one for each wheel except the highest order wheel. The tens-carry elements 152 are securely fastened to the gear wheels 153 which are loosely mounted on a shaft 154 mounted in standards 123 and 123', there being in the embodiment shown, six of the gear wheels 153, one for each tooth wheel except the lowest order wheel. The elements 152, the gear wheels 153, and the tooth wheel 150 may be considered to constitute the tens-carry mechanism. The gear 153 meshes with the gear 151 of the lower order wheel, and the elements 152 are arranged to engage the toothed wheel 150 of next higher order wheel when a tens-carry operation is effected.

In order that the recesses 148 on the inner periphery of the hub 146 may be properly aligned for the reception of the key 149 on the spindle, I provide a bar 155 (Fig. 3) whose ends are rigidly secured to the standards 123 and 123'. One side of this bar is flattened, and to the flattened portion is secured a number of spring strips 156, each carrying a roller 157 of suitable diameter to engage the gear 153 between any two teeth thereon to hold the hubs of the register wheels in such position that the notches will be in perfect alignment as stated, and since the numerals on the register wheels bear a definite relation to the recesses or notches, the numerals on the reading line of the register will also be in alignment.

*Control means for the register mechanism*

Referring again to Figure 4, the numeral 158 designates the control bar which determines which one of the wheels of the register will receive the information, and also whether the information will be added or subtracted.

The rollers 14 and 16 (Figs. 1 and 3) are mounted on studs 159 on the side of the escapement bar 13. These studs are each provided with a threaded socket for reception of screws 160, which screws serve as means for attaching the control bar to the escapement rack, Fig. 3. The control bar is provided with a series of notches d (Fig. 4) having camming surfaces e, the notches and camming surfaces varying in depth and extent according to the width of the fields or the number of colums in the fields. The notches and the cam surfaces function to position the key 149 on the spindle 141 in the recesses 148 of the hub 146 of the numeral wheel, corresponding to the column in the field to be punched.

The bell-crank lever 144 is pivoted at 161 in the end of a short arm 162 secured to the standard 123 (Figs. 3 and 4). The lower arm 163 of the lever carries a laterally extending stud 164 whose lower side has a camming surface 165 shaped to smoothly ride upon the cam surfaces e in the notches d. This stud, in the operation of the machine enters one or another of the notches in the control bar and is raised by the cam surfaces e of the particular notch entered when the control bar and the escapement rack are advanced, and consequently by reason of the connection of the yoke 143 with the spindle 141, the stud 164 will be dropped to the bottom of any notch it enters, the depth and width of the notch being determined by the width of the fields and the number of colums to be punched in the fields of the card. When the stud drops to the bottom of any notch, the lever 144, under the influence of spring 166 will move the spindle 141 and its key 149 to the left to enter the recess in the numeral wheel appropriate to the highest order column in the card field, and the deeper the notch the greater will be the movement of the spindle toward the left, and consequently the higher the order of wheel in the register that will be engaged by the key 149. For instance, as illustrated in Fig. 4, the first two notches f would be of a depth corresponding to a card field of four columns, and another notch g will be appropriate to a three-column field, and the deepest notch h will be for a six-column field, the depth of the notches, as stated, varying according to the columns in the card field. The function of the notches d and their camming surfaces e is solely, in cooperation with the bell crank 144, to shift the spindle and consequently the key 149 into the proper numeral wheel of the register. It is immaterial to the mechanism constituted by the notches d and bell-crank 144 whether there is addition or subtraction going on in the register.

Addition and/or subtraction is entirely controlled by the formation of the bar 158 upon which there is a ledge 167 interrupted to form two openings 168 and 169, the ledge adjacent 169 being turned down as indicated at 170, for a purpose that will presently appear. The lower arm 172 of lever 127 pivoted at 173 on an arm 174 attached to standard 122, is provided with a stud 175 (Figs. 3 and 4), which rests on the upper side of the ledge under the influence of spring 176 and runs on the underside of the ledge when the clutch portion of the gear 120 engages the clutch member 130. As illustrated, when stud 175 is riding on the top of the ledge, the machine is set for addition or for adding amounts in the register, but as the control bar moves to the left with the escapement rack, said stud will pass through the opening 168 under the influence of spring 176, bringing the stud below the ledge, thereby causing the lever 127 to shift the sleeve 120' out of engagement with the clutch member 135 and into engagement with the clutch member 130 rotating the spindle 141 in opposite direction when rotated by segment 119, and thereby setting the mechanism for subtracting amounts in the register. As the control bar traverses the various fields on the card, the amounts punched in said fields will be successively subtracted from the register until the stud 175 engaging 170, again passes to the top of the ledge 167 through the opening 169, thereby shifting the sleeve 120' back to the position illustrated, and resuming addition in the register.

As stated, the machine is capable by reversal of direction of rotation of the spindle, to either add or subtract with equal facility, and may add for any part of the length of the card, the operator taking the total from the register at any point on the card, and punching that total, and when doing so may subtract this total from the register, thereby obtaining zero in the register, and from this point proceed to punch the rest of the card to obtain another total which may be punched on the card, or the first total may not be subtracted, and the last total may represent the grand total. These possibilities are all provided for in the making of the control bar, the formation of which will vary both as to number and depth of notches d and the number and location of the openings in the ledge 167 to control the mechanism for either addition or subtraction according to the requirements in respect to a particular class or group of cards operated upon.

Sometimes it is desirable to punch an amount in a column which may be between two fields and which amount is not to be stored in the register. In such a case the control bar will be made with an extension 177 (Fig. 4a) on the camming surface of a notch which will lift the stud 164 an additional distance sufficient to rock the lever 144 to the right and thereby bring the key 149 beyond the recess 148 of the hub of the unit wheel and into a clear annular space 178 (Fig. 11) in which the key on the spindle may rotate without turning any numeral wheel of the register. The arrangement of the hubs with their internal variations is such as is shown in Fig. 9, that a clear annular space 179 like the space 178 at the unit wheel side of the register will be provided at the opposite end of the register. This latter space shortens the distance of travel of the spindle, so that the key and consequently the spindle need travel only the distance equal to the combined widths of six wheels and still make the proper engagement with the seventh wheel to rotate it in either direction accordingly as to whether the machine is adding or subtracting.

It will be observed that the camming surface of the last notch of the control bar (Fig. 4) is somewhat longer than the other notches, thus providing a high point 180 which will lift the stud 164 an additional distance and cause the lever 144 to shift the key 149 into the recess 178 at the end of the card travel, and at this point, the stud will rest upon the high point 180 of the notch while the punched card is being removed and another inserted. During this action by the operator, the lever 144 will be all the way to the right. There is a rod 181 whose bent end 182 extends through an aperture in the lever 144 and whose other end is guided in a lug 183 integral with the bar 174. Beyond the lug the rod is bent to form a lateral extension 184 to engage the lever 127 and prevent the stud 175 from dropping, under the influence of spring 176, through the opening 168, or any other similar opening which may be provided in the ledge 167. The time during which the lever 127 is held by rod 181, is when the card carriage is being manually shifted to the right to bring the new card into punching position in the machine. When the operator starts to move the card carriage, the knurled knob 185 will be grasped to hold the spindle in its extreme right-hand position, thus lifting the stud 164 on lever 144 and stud 175 on lever 172 out of engagement with the control bar. When the spindle is held in its extreme right-hand position, the card carriage and control bar may be moved freely in either direction without interfering with the control bar.

*Mechanism for preventing overthrow of register wheels*

Referring to Figs. 3, 3c and 3d, the numeral 186 designated a plate fastened to the plate 32 which in turn is fastened to the housing 25 (Fig. 2). The plate 186 has formed thereon a series of ears 187 which support and guide a corresponding number of pins 188 whose right-most ends abut against the sides of the extensions 112. The plate 186 is formed with a turned-up portion 189 having apertures therethrough for the support and guidance of the opposite ends of said pins, and a shoulder 190 to limit the upward movement of the actuator arm 113' is formed on the turned-up portion or flange 189. The ears 187 on the plate 186 are in step formation to accommodate the varying lengths of the pins, which pins are varied in length to reach the various extensions 112 of the punch actuating bars 29 (Fig. 3) The left ends of the pins are bent as shown at 191 and on the extreme end of the bent portion is a tit 192, the purpose of which will presently appear.

Adjacent the ends of the pins 188 is a block 193 formed with ear 194 perforated for the passage of screws by which the block is secured to the upper end of a cover plate 195 (Figs. 3, 5a and 5b). Transverse grooves 196 are formed in the block, in each of which is pivoted a small stop lever 197, each of which is apertured for the passage of a small pivot pin 198 by which all of the stop levers are pivoted in their respective recesses. The levers are further provided each with a pocket 199 for the reception of a light spring 200 tending to force the levers out of the recesses, the block being drilled as at 201 to receive the other ends of the springs. The levers 197 are further provided each with a small hole 202 to receive the tit 192 on the pins 188, which tits are always in engagement with the levers and tending to hold the opposite ends of the pins always in engagement with the extensions 112 of the punch actuating bars.

Adjacent the ears 187 on the plate 186 and on the lower ends of the extensions 112 of the punch actuating bars, are secured wedges on cams 203 (Figs. 1 and 3 and 5) that work on the ends of any of the pins 188 to cam them to the left when its corresponding key is depressed to advance the punch actuating bar. When a cam moves a pin, it forces its corresponding lever 197 back into its recess, thereby bringing the end of the lever into the path of movement of a stop 204 carried by segment 119 of the register operating arm 113', thereby arresting the downward movement of said arm and positively preventing overthrow of the segment, and parts rotated thereby, thus assuring that the proper amount, corresponding to the key depressed, will be entered in the register.

On the side of the extension 112 of the punch actuating bars, I provide pins 205 to prevent side thrust when the cam action of the cams takes place to move the pins 188.

There are twelve actuator bars 29, but only nine of these operate the register. The three actuator bars for the keys "V", "X" and "O" do not operate the register and, therefore, are devoid of the extension 110 comprised of parts 111, 112 and 113, as shown in the detail Fig. 5c. There is no pin 188 for the number "9" key, and, therefore, there is provided a permanent stop 206 on the block 193 (Fig. 3) to perform the same function as the movable stop levers 197 which are mounted in the block 193, for, as stated, limiting the downward movement of the segment 119.

Referring to Fig. 8, the numeral 207 designates a lever pivoted at 208 to the cross-bar 67 and formed with a recess 209 which receives the end of the plate 33. The lever has an extension 210 which extends through a slot in the plate 32. The lever is further formed with a down-bent portion 211 that terminates in a lateral extension 212 which extends below the arm 113', the lever serving when operated to lift and restore said arm with its segment 119 to normal or starting position. This lever is operated by the depression of any key except the release key, which is the only key, the operation of which does not close the circuit that energizes the magnets 49 and 50. When the magnets are energized, the lever 207 will be operated in either direction through the linkage 38, 41 and 44 (Fig. 2) accordingly as one or the other of the magnets is energized.

Referring to Fig. 13, A indicates the upper portion of a card bearing indicia relating to agricultural statistics, and it illustrates a sample of the information that may be either added or subtracted, or added and subtracted in the register— the numerals arranged above the card indicating the number of columns in each field. In the showing, the first three fields B contain data such as "State," "county" and "district" not to be entered in the register. In the card illustrated, C indicates a field of four columns. In a supposed operation, the total acre information is, at the outset, added in the register. Thereafter, the information in six fields D from "harvested" acres to "idle" acres, is successively subtracted from the register, and if the punching has been correctly done, the register will show "zero" at the end of the "idle" field.

*Electric circuit for operating the punch and returning the machine parts to normal position*

Fig. 14 illustrates a diagram showing the electric circuits for the magnets 49 and 50, whereby at times both sets of magnets are simultaneously energized and at others, one or the other set is energized. There is a switch 213 employed between the source of current 214 and the contacts, and when the switch is closed, the circuit, which is never broken, in the operation of the machine, is shifted from one set of magnets to the other. From the source 214, the current flows through suitable resistance 214' over wire 215 to magnets 50, and thence over wire 217 to contact strip 94, which carries contact point 93 in contact with contact point 92 of contact strip 88 and over wire 218 back to source. When a key is depressed, the shoulder 77 on rod 76 will lift the metallic piece 100 and before the contacts 92 and 93 are broken, the contacts 86 and 87 will be closed. On the further upward movement of the rod 76, the contacts 92 and 93 are broken so that the current will pass from the source over wire 215 to magnets 49 and from thence, over wire 219, to contact strip 85 through contact points 86 and 87 that are now closed to contact strip 88, and thence over wire 218 back to source. As illustrated, it is the magnets 49 that supply the power to do the punching and magnets 50 function to restore certain parts of the machine to normal position, without the use of the usual springs for this purpose.

Referring to the modification illustrated in the Figs. 15–20 the numeral 219' designates a commutator which will usually be mounted upon a shaft like 220, either to revolve on the shaft or with the shaft, accordingly as which will be more convenient in the organization in which it is used. This comprises a cylindrical body 221 of insulating material. In the periphery of the body is a metallic conducting insert 222 which entirely surrounds the body, and is connected with a shorter insert 223 by a connector 224. The numeral 225 designates another metallic insert which extends around the periphery of the body to points where it is connected with the insert 223 by shorter connectors 226 and 227. The inserts 223 and 225 may be of any suitable length and connected by connectors of any suitable length.

Numerals 228, 229 and 230 designate resilient contact strips which are, in the embodiment illustrated, mounted upon a block 231 of insulating material.

Numeral 232 designates a source of electrical energy. A wire 233 leads uninterruptedly from the source to the contact strip 228 which contacts with the insert 222, and, as illustrated, connects this insert through connector 224 with the insert 223, and through connector 226 connects with the insert 225 which is in contact with contact strip 230, and from thence the current passes over wire 234 through resistance 235 and through a second resistance 236 and switch 237, back to the source. The circuit thus far described is the first branch circuit. Leading from wire 234 at 238 is wire 239 which leads to any device diagrammatically shown at 240 which may require intermittent electrical energy and, as shown, enters such device at 241. From the device, after performing the work required, the current passes over wire 243 to contact strip 229. As illustrated, this circuit is now open, but upon rotation of the commutator the strip 229 will contact with the insert 223 and the current will pass over the connector 224 to the insert 222 and over contact strip 228 and wire 233 back to the source. It will be noted that shortly after the contact strip 229 makes contact with the insert 223 the strip 230 breaks contact with the insert 225, but momentarily, during the rotation of the commutator, while the contact strips 229 and 230 are in contact with the inserts 223 and 225 at points j of insert 225, thus shifting the current from the contact strips 228 and 230 to the contact strips 228 and 229, thus completing the circuit through the device 240 without breaking the main circuit.

*Operation of punching mechanism*

Assuming a card to be in position to be punched, a key is depressed which will cause its punch actuator bar to move to the left until the shoulder 106 (Fig. 2) is beneath the plate 33, so that when the plate is pulled down by the bent lever 38, the rear edge of the plate, engaging the shoulder 106, will move the actuator bar down, and since there is the slot-and-pin connection 30—31 between the bar and the punch 21, the punch will be actuated to punch the card. As the actuator bar is forced forward, the bail 73 will be engaged by the shoulder 74 of the recess 69 and moved to the left, rocking the bellcrank 72, lifting the rod 76, causing the shoulder 77 thereon to engage the metal piece 100 (Fig. 3) to make the proper contact to energize magnets 49, which exerting a pull upon the lever 38, will pull the left end of the actuator bar downward to actuate the punch. Upon the actuation of the punch, the shoulder 77 of rod 76 will be disengaged from the metal strip 100 by pin 79 on link 44 as said link moves to the right, deenergizing magnets 49 and again energizing magnets 50, thus, through linkage 41 and 38, restoring the actuator bar 29 and parts carried thereby, to normal position.

*Operation of register mechanism*

The card carriage being in its extreme left position, a card is placed upon the carriage bed with one end under the lip 11 (Fig. 1) and the other against abutment 10' (Fig. 5). The operator will then grasp the knob 185 and pull the spindle to its extreme right position, which action will move levers 127 and 144 (Fig. 4) and bring the studs 175 and 164 to inoperative position, with the stud 164 above the upper edge of the control bar 158, and the stud 175 will be held out of engagement with the upper side of the ledge 167. While the studs are in the position just described, the card carriage will be moved to the right by the operator to position to punch the card. When the knob 185 is released, the studs 175 and 164 will, under the influence of springs 176 and 166, be brought into operative position, the stud 175 on the top of ledge 167, and the stud 164 in the bottom of an appropriate notch in the control bar. At the beginning the register will show zero, and assuming the schedule from which the information or data is to be taken shows the total number of "acres" for instance, the operator will depress the appropriate keys to visibly register in the register such total number, which will appear in the "total acres" field of the card. Now if the rest of the information is relative to the different kinds of "acres" and their numbers appear on the schedule under appropriate headings corresponding to the different fields allotted to the particular kinds of acres, such for instance as "harvested acres," "pasture acres," etc., the operator will punch in the appropriate field the number of a particular kind of acres and each of the particular kinds of acres will be subtracted from the total number of acres punched in the first field and so on, until the last field is reached, and if the punching has been correct throughout, the total of all kinds of acres will agree with the total first punched, but having been successively subtracted from the total number punched in the "total acres" field, the register will again show zero.

When the operator punched the total number of acres in the first "total acres" field, the stud 175 will have been above the ledge 167, but as the card and control bar are stepped forward, the stud will pass through the opening 168 and run below the ledge, and when the card reaches the next field which is for the kind of acres to be subtracted from the total of all the kinds of acres, the machine will be in condition for subtracting.

The machine is now conditioned for subtracting because during this movement of the carriage, the stud 175 drops through the opening 168, thereby, through the instrumentality of the lever 127, shifting the clutch member 129 out of engagement with the clutch member 135 and the clutch member 128 into engagement with the clutch member 130. From now on with the stud 175, as the control is illustrated, the stud will remain below the ledge and the machine will continue to subtract on the register as the control bar is advanced, and until the opening 169 reaches the stud, which stud will be carried upward through said opening, bringing about a reversal of the position of the clutch members above referred to, and adding on the register instead of subtracting.

Whether the machine is adding or subtracting, the position of the lever 144 which moves the spindle 141, determines the position of the key 149 and consequently determines which one of the numeral wheels will be actuated. Obviously, the direction in which the spindle is rotated determines as to whether the machine is adding or subtracting, and the direction of rotation of the spindle is governed accordingly as to whether the stud 175 is above or below the ledge 167 of the control bar as it advances, which position of the stud 175, as has been explained, determines which of the clutch members 130 and 135 is in engagement with the gear 120.

The springs 139 and 140 are wound in opposite directions and their coils are closely wound and also closely fitted on the sleeve, tight on the keyed sleeve which does not have to slip in the spring, and close on the other which does slip upon the return movement of the sleeve. The effect of this manner of mounting the springs on the sleeves is that when the springs are turned they will immediately grip on the sleeves and cause the sleeves and their clutch members to rotate together when the gear 120 is actuated. As illustrated in Fig. 4, when the arm 113' is depressed by the punch actuating bars, the spindle will be rotated in clockwise direction (looking toward the right) and the amount commensurate with the movement of the segment 119 will be added in the register on the downstroke of said segment, but when the lever 127 shifts the sleeve 120' so that the clutch members 128 and 130 are in engagement, the spindle will be rotated or revolved in counter-clockwise direction, and the amount subtracted from the register on the upstroke of the segment. This will be at a time when the magnet 50 is again energized and the plate 33 is lifted through the linkage 38, 41 and 44, and the lever 207, pivoted at 208, being in permanent engagement with the plate 33 at 209, will be raised. This will cause the extension 212 (Fig. 8) to engage the arm 113' on the underside and impart to the segment 119 a positive upward movement to normal position, in which it is stopped by the shoulder 190 on the plate 186.

Upon the movement of the segment in either direction, down for adding, and up for subtracting, the segment is free to move except when intercepted by one or another of the stop levers 197 accordingly as to which of the keys has been depressed to advance its corresponding pin 188 and force its stop lever back into its recess in the block 193 against spring 200, in position to be engaged by the stop 204 on the segment. This engagement between the stop and lever insures that the exact amount, corresponding to the key depressed, will be registered in the register and prevent overthrow of the spindle and consequently the numeral wheels. As illustrated, when any key from "1" to "9" is depressed, the spindle will be rotated in an amount equal to the amount represented by the key. The stud 164 is shown in a notch representing a field of four card columns, and the key 149 is in the fourth highest order wheel. Now as the control bar is stepped to the left with the stud 164 riding on the cam surface e, it will be necessary to depress either four keys in succession, or one key four times, to bring the stud on the top of the notch, meanwhile moving the spindle with key 149 step by step from the "thousands" wheel to the unit wheel. Upon the further advancement of the control bar, the stud 164 will drop into the next notch which is, as illustrated, also a four-column notch for a four-column card field, and in dropping into the bottom of the notch will bring the key 149 back into the "thousands" column wheel. It is obvious that as the control bar advances, it brings the notches of different depths successively into position, to receive the stud 164 and shift the key 149 to correspond with the higher or lower order columns in each field. For instance, when the card is to be punched in the "hundreds" column, then the key 149 will have been shifted to the third or "hundreds" wheel of the register.

As stated in the general description, it is sometimes desirable to punch in one or more columns between two card fields without registering on the register. I provide for this by extending the cam surface e of the control bar to a point higher than the rest, as illustrated at 177 in Figs. 4a and 11, so that the stud 164 will rest on this additional high point 177 which will cause the lever 144 to move the spindle to the extreme right bringing the key 149 into the clear annular space 178 wherein no register wheel will be operated when the spindle is rotated. However, as the bar is further advanced the stud 164 will drop into an appropriate notch for a field to be punched and registered.

Every bar will have an extension of the cam surface of the last notch as indicated at 180 (Fig. 4) so that after the last field to be registered is punched, the stud 164 will rest on the top of the cam surface of the last notch, in which position the stud will be lifted sufficiently high to bring the spindle to its extreme right-hand position. In doing this the bent end 184 of the rod 181 will engage the lever 127 and lift the stud 175 on to the top of the ledge 167 through an opening at the end of the card travel similar to 169, provided the stud had been below the ledge due to subtracting operation. When the punching of the card is finished, the stud 164 will be resting on the high point 180 and the stud 175 will be above the ledge 167. When the studs are in the positions mentioned, the escapement rack and the control bar are free to move in either direction when the operator, grasping the knob 185, holds the spindle in its extreme righthand position, bringing the key 149 into the free annular space at the end of the register. When the spindle is held in this position, the operator will insert a new card and bring the card carriage and card into position to be punched. When the spindle is released, the stud 164 will drop into an appropriate notch and the stud 175 will be either above or below the ledge 167, accordingly as to whether the next field is to be added or subtracted.

When a tens-carry operation is to be effected in an adding operation of the machine, the spindle will rotate the register wheel in clockwise direction, and the gear 153 being in mesh with the gear 151 on the register wheel, will be rotated in counter-clockwise direction. Any time the zero point on the register wheel passes the reading line of the register, the tens-carry element 152 will engage one or another of the teeth on the tooth wheel 150 of next higher order and effect a tens-carry.

In a subtracting operation the spindle with its register wheel will be revolving in the opposite direction, and consequently the zero point again passes the reading line of the register, the tens-carry element 152 will engage the tooth wheel as before, and rotate it in opposite direction and subtract one from the next higher order wheel.

When the hubs 146 of the register and the numeral wheels carried thereby have been brought to rest, the recesses in the hubs for the reception of the key 149 are in alignment, and to assure that they will stop in the right place and remain in alignment, the rollers 157 carried by the spring strips 156 are provided and extend between any two teeth of the gear wheel 153 in position to be engaged by the roller. The tension of the roller against the gear wheel is such that it will, while aligning the notches in the hubs for the free passage of the key 149, permit the gear to be rotated in either direction.

The operation of the means comprising the balls 165 and the extension 68 on the actuator bars 29, for preventing more than one key to be depressed at a time has, it is thought, heretofore been sufficiently described, and the operation of this feature of the machine need not be repeated.

I claim:

1. In a machine of the character described, in combination, a register including a plurality of registering elements arranged for operation in two directions, a control element advanced with a step by step movement, operative connections between the control means and the registering elements for selecting the registering element to be operated in one direction, the control element having additional means for actuating the registering element in the opposite direction, upon the advancement of the control element, and means for operating the selected registering element in either direction.

2. In a machine of the character described, a control bar and means for advancing the same with a step-by-step movement, a rotatable and shiftable spindle, a plurality of numeral wheels rotatably mounted on the spindle, means for rotating the spindle, means for shifting said spindle, means carried by the control bar and cooperating with the spindle shifting means to determine the extent to which said spindle is shifted, and means carried by the spindle and adapted to engage and rotate one or another of the numeral wheels when the spindle is rotated.

3. In a machine of the character described, a control bar and means for advancing the same with a step-by-step movement, a rotatable and shiftable spindle, means for rotating the spindle and means for shifting said spindle, a plurality of numeral wheels rotatably mounted on said spindle, a series of cam surfaces carried by the control bar and cooperating with the spindle shifting means to determine the extent to which the spindle is shifted, and means carried by the spindle and adapted to engage and rotate one or another of the numeral wheels when the spindle is rotated.

4. In a machine of the character described, a control bar and means for advancing the same with a step-by-step movement, a rotatable and shiftable spindle, means for rotating the spindle, a plurality of numeral wheels rotatably mounted on the spindle, a pivoted lever for shifting the spindle, means carried by the control bar and cooperating with said lever to shift the spindle and determine the extent to which the spindle is shifted, and means carried by the spindle and adapted to engage and rotate one or another of the numeral wheels when the spindle is rotated.

5. In a machine of the character described, a control bar formed with a plurality of notches having cam surfaces of varying lengths, means for advancing said bar with a step-by-step movement, a rotatable and shiftable spindle, means for rotating said spindle, means interposed between said control bar and spindle and having operative connection with said spindle to shift the same, means carried by the spindle-shifting means and cooperating with the cam surfaces of the control bar as the same is advanced, to determine the extent to which the spindle will be shifted, a plurality of numeral wheels rotatably mounted on the spindle, means carried by the spindle and adapted to engage and rotate one or another of the numeral wheels when the spindle is rotated.

6. In a machine of the character described, a control bar and means for advancing the same with a step-by-step movement, said bar being formed with a series of cam surfaces of varying depths, a register including a plurality of numeral wheels, mechanism interposed between said control bar and register, and actuated by the cam surfaces of the control bar to selectively engage the next lower order numeral wheel as the control bar advances.

7. In a machine of the character described, a rotatable and shiftable spindle, means for rotating and means for shifting said spindle in either direction, a plurality of higher and lower order numeral wheels rotatably mounted on said spindle, means carried by the spindle for rotating the numeral wheels when the spindle is rotated, a control bar and means for advancing the same with a step-by-step movement, said bar being provided with notches of varying depths and cam surfaces of varying lengths cooperating with the spindle shifting means, the depth of said notches controlling the extent to which the spindle is shifted in selecting the higher order wheel, and the cam surfaces serving to shift the spindle to cause the numeral wheel rotating means to engage and rotate the next lower order wheel, when the control bar is advanced.

8. In a machine of the character described, a rotatable and shiftable spindle, means for rotating and means for shifting said spindle, a plurality of numeral wheels of higher and lower order mounted rotatably on said spindle, means carried by the spindle for rotating the numeral wheels when the spindle is rotated, the lowermost order wheel having an annular recess in which the wheel-rotating means carried by the spindle may rotate without affecting an operation of the wheel, a control bar and means for advancing it with a step-by-step movement, said bar being provided with cam surfaces one or more of which is extended above the rest, means carried by the spindle-shifting means and adapted when positioned on such extended cam surfaces to actuate the spindle-shifting means to shift the spindle to bring the numeral wheel-rotating means in the said annular recess wherein the lowest order numeral wheel will not be actuated when the spindle is rotated.

9. In a machine of the character described, a rotatable and shiftable spindle having numeral wheels rotatably mounted thereon, means for rotating and means for shifting the spindle, a plurality of numeral wheels of lower and higher order rotatably mounted on said spindle, a control element and means for advancing said element with a step-by-step movement, the control element cooperating with the spindle-shifting means to shift the spindle to cause the wheel-rotating means thereon to selectively engage the numeral wheels according to the extent to which the spindle-shifting means is actuated by the control element.

10. In a machine of the character described, a rotatable spindle, means for rotating said spindle, clutch means on said spindle controlling the direction in which the spindle will be rotated, means for operating said clutch means, a control bar and means for moving the same with a step-by-step movement, specific controlling means carried by the control bar, means carried by the clutch-shifting means and cooperating with the specific controlling means of the control bar to determine the direction in which the spindle will turn when rotated.

11. In a machine of the character described, a rotatable spindle and means for rotating it, clutch means on said spindle controlling the direction of rotation of the spindle, means for operating the clutch means, a control bar and means for advancing the same with a step-by-step movement, a ledge on said control bar and provided with openings, means carried by the clutch operating means and cooperating with the ledge and the openings therein to determine the direction of rotation of the spindle.

12. In a machine of the character described, a rotatable spindle and means for rotating it, clutch means on the spindle controlling the direction of rotation of the spindle, a pivoted lever having operative connection with a portion of the clutch means, a control bar and means for advancing it with a step-by-step movement, the said bar being provided with a ledge having openings therethrough, means carried by the lever and cooperating with the ledge and the openings therein, to determine the direction in which the spindle will be rotated accordingly as to whether said means carried by the lever is positioned above or below said ledge.

13. In a machine of the character described, a rotatable spindle, a plurality of numeral wheels of higher and lower order rotatably mounted on the spindle, clutch members on said spindle including a member provided with a gear, a rockable member provided with a tooth segment in mesh with said gear, means for rocking the rockable member in varying degrees to likewise rotate the gear and thereby rotate the spindle, and means carried by the spindle for rotating one or another of the numeral wheels when the spindle is rotated.

14. In a machine of the character described, a rotatable spindle, a plurality of wheels of higher and lower order rotatably mounted on said spindle, clutch members on the spindle including a member provided with a gear, a pivoted member provided with a tooth segment in mesh with said gear, a plurality of devices arranged to engage the pivoted member at varying distances from its pivot to determine the extent to which the pivoted member will be rocked, means carried by the spindle and adapted to engage one or another of the numeral wheels to rotate the same according to the extent to which said pivoted member is rocked.

15. In a machine of the character described, a rotatable spindle, a plurality of numeral wheels rotatably mounted on said spindle, clutch members on said spindle including a member provided with a gear, means cooperating with the gear to rotate the numeral wheels, a plurality of actuating bars cooperating with the gear rotating means to move said means more or less according to which one of said bars is operated, and means carried by the spindle for selectively engaging the numeral wheels when the spindle is rotated.

16. In a machine of the character described, a rotatable spindle, a plurality of numeral wheels mounted on said spindle, clutch members on said spindle including a gear, means for shifting said clutch members to rotate the spindle in either direction, means cooperating with the gear to rotate the spindle, a plurality of actuating bars cooperating with the gear rotating means to move said means more or less according to which one of said bars is operated, and means carried by the spindle for selectively engaging the numeral wheels to rotate them in the direction in which the spindle is rotated.

17. In a machine of the character described, a rotatable spindle, a plurality of numeral wheels rotatably mounted on said spindle, clutch members on said spindle including a gear, means for shifting the said clutch members to rotate the spindle in either direction, means cooperating with the gear to rotate the spindle, a plurality of actuating bars for depressing the gear operating means more or less according to which one of the actuating bars is depressed, and positive means for returning said gear operating means to normal position.

18. In a machine of the character described, a rotatable spindle, clutch members on the spindle including a gear, means for shifting the clutch members to rotate the spindle in either direction, means cooperating with the gear to rotate the spindle, a plurality of actuating bars for depressing the last-mentioned means to a varying extent accordingly as to which bar is operated, to rotate the gear, and positive means for returning said gear rotating means to normal position after such depression.

19. In a machine of the character described, a rotatable spindle, clutch members on the spindle including a gear, means for shifting the clutch members to rotate the spindle in either direction, means cooperating with the gear to rotate this spindle, a plurality of actuating bars for depressing the last-mentioned means to a varying extent accordingly as to which bar is operated, to rotate the gear, and a motor actuated element for returning said gear rotating means to normal position.

20. In a machine of the character described, a rotatable spindle, clutch members on said spindle including a gear for rotating the spindle, means cooperating with the gear to rotate the spindle, a plurality of actuating bars for depressing the last-mentioned means to a varying extent accordingly as to which of the actuating bars is operated, to rotate the gear, additional means for raising the gear operating means, a positive means for depressing, and positive means for raising the gear operating means.

21. In a machine of the character described, a rotatable spindle, clutch members on the spindle including a gear for rotating the spindle, means cooperating with the gear to rotate the spindle, a plurality of actuating bars for depressing the last-mentioned means to a varying extent accordingly as to which of the actuating bars is operated, to rotate the gear, and additional means for raising the gear operating means, and a motor-operated element for positively depressing and for positively raising the gear operating means.

22. In a machine of the character described, a rotatable spindle, clutch members on the spindle including a gear for rotating the spindle, means cooperating with the gear to rotate the spindle, a plurality of actuating bars for depressing the last-mentioned means to a varying extent accordingly as to which of the actuating bars is operated, to rotate the gear, additional means for raising the gear operating means, and a motor operated element for positively depressing and for positively raising the gear operating means, said element being actuated by two opposing motors.

23. In a machine of the character described, a register, a numeral wheel carrying spindle forming a part of said register, a gear on said spindle, means for actuating the register comprising a pivoted arm carrying a rack segment in mesh with said gear, a plurality of actuator bars arranged to operate on said pivoted arm to rock said arm in varying extent to correspondingly actuate the register, and means for controlling the extent of movement of said pivoted arm and preventing overthrow thereof.

24. In a machine of the character described, a register, a numeral wheel carrying spindle forming a part of said register, a gear on said spindle, means for actuating the register comprising a pivoted arm having a rack segment thereon in mesh with said gear, and a plurality of actuator bars operating on the pivoted arm at varying distances from the pivotal point of said arm, whereby when said bars are actuated the pivoted arm will be rocked to a greater or lesser extent to correspondingly operate the register.

25. In a machine of the character described, a register, a numeral wheel carrying spindle forming a part of said register, a gear on said spindle, means for actuating the register comprising a pivoted arm having a rack segment thereon in mesh with said gear, a plurality of actuator bars operating on the pivoted arm at varying distances from the pivotal point of said arm, whereby when said bars are actuated the pivoted arm will be rocked to a greater or lesser extent to correspondingly operate the register, and means for preventing overthrow of the segment and spindle.

26. In a machine of the character described, a slidable and rotatable spindle, a plurality of registering elements rotatably mounted on said spindle and arranged for selective operation, a gear loosely and slideably mounted on the spindle, clutch means rotating with the spindle and cooperating with said gear to rotate it in the direction of the rotation of the spindle, means carried by the spindle for engagement with one or another of the register elements to rotate the same, a rockable arm carrying a rack in mesh with said gear for rotating said gear and spindle, a plurality of stop members, a plurality of stop member actuating pins, stop means carried by the rockable arm and means for moving the stop member actuating pins to bring the stop members into the path of movement of the stop means of the rockable arm to prevent overthrow of said arm and rack.

27. In a machine of the character described, a slidable and rotatable spindle, a plurality of registering elements rotatably mounted on said spindle and arranged for selective operation, a gear loosely and slideably mounted on the spindle, clutch means rotating with the spindle and cooperating with the gear to rotate it in the direction of rotation of the spindle, means carried by the spindle for engagement with one or another of the register elements to rotate the same, a rockable arm carrying a rack in mesh with said gear to rotate said gear and spindle, a plurality of spring pressed pivoted levers, a plurality of pins for actuating said levers, stop means carried by the pivoted arm and means for moving the lever actuating pins to bring the stop means carried by the pivoted arm into the path of movement of the stop lever to prevent the overthrow of the arm and rack.

28. In a machine of the character described, a spindle, a gear loosely mounted on said spindle, a rockable arm carrying a rack in mesh with said gear, a reversing clutch on said spindle, means for shifting said clutch to control the rotation of the spindle in either direction accordingly as to whether the rack is rotating the spindle upon the upstroke or downstroke, and means for preventing the overthrow of the rack in either direction at predetermined points in the movement of the rack.

29. In a machine of the character described, in combination, means for perforating a record, a source of electrical current, a main circuit, a resistance in said main circuit, two branch circuits, a set of magnets in each branch circuit, contacts, and means for moving said contacts to shift the current from one set of magnets to the other before breaking the first branch circuit, an armature for each set of magnets, a link connecting the two armatures, whereby when one or the other of the set of magnets is energized said link is moved, and operative connections between said link and the record perforating means for operating said record perforating means to perforate the record.

30. In a machine of the character described, in combination, means for perforating a record, a source of electrical current, a main circuit, a resistance in said main circuit, two branch circuits, a set of magnets in each branch circuit, contacts, and means for moving said contacts to shift the current from one set of magnets to the other without breaking the main circuit, an armature for each set of magnets, a link connecting the two armatures, whereby when one or the other of the set of magnets is energized said link is moved, and operative connections between said link and the record perforating means for operating said record perforating means to perforate the record, and for restoring the record perforating means to normal position.

31. In a machine of the character described, in combination, record perforating mechanism, a source of electrical current, a main circuit and two branch circuits, a magnet in each branch circuit, one for operating the record perforating mechanism and the other for restoring said mechanism to normal position, means for shifting the current from one branch circuit to the other without breaking the main circuit, an armature for each magnet, a link connecting the armatures, mechanism moved by said link for operating the record perforating mechanism, contacts in the branch circuits, means for closing the contacts in the circuit to the magnet for controlling the record perforating mechanism, and means carried by the link for opening said contacts to said magnet after the record perforating operation, and thereby shifting the current into the magnet for restoring the record perforating mechanism to normal position.

OLUF L. CLEVEN.